Figure 1:
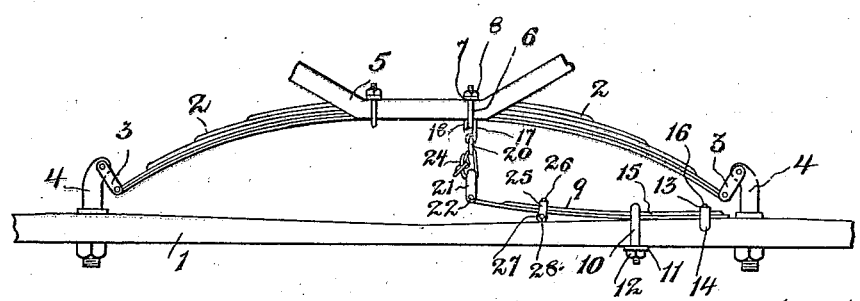

Mar. 6, 1923.

R. I. SPENCER

SHOCK ABSORBER

Filed Dec. 16, 1921

Inventor:
R. I. Spencer
by Egerton R. Case,
Atty.

Patented Mar. 6, 1923.

1,447,439

UNITED STATES PATENT OFFICE.

ROYDEN IVOR SPENCER, OF PONTYPOOL, ONTARIO, CANADA.

SHOCK ABSORBER.

Application filed December 16, 1921. Serial No. 522,908.

*To all whom it may concern:*

Be it known that I, ROYDEN IVOR SPENCER, a subject of the King of Great Britain, residing in Pontypool, county of Durham, Province of Ontario, Canada, have invented certain new and useful Improvements in Shock Absorbers, of which the following is a specification.

My invention relates to shock absorbers, and has particular reference to an anti-reaction spring suitable for use in connection with various types of automobiles, and in the following specification, and in the drawings forming part thereof, I shall illustrate my invention as mounted for use in connection with the front spring on a Ford automobile.

The prime object of the invention is to prevent the excessive re-action of the main body springs so that the automobile will ride much easier than without the same.

The above and other objects, and the novel features of my invention will be hereinafter particularly set forth, and what I claim as new will be set forth in my claims forming part of this specification.

Figure 3:
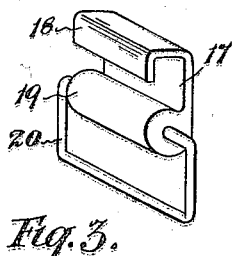
Figure 4:
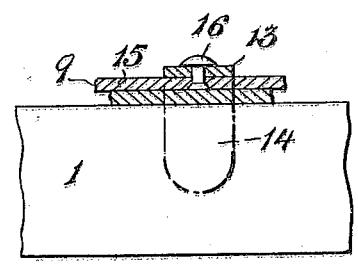
Figure 2:
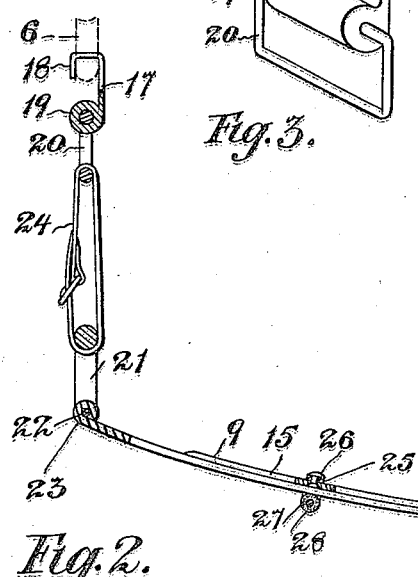

Fig. 1 is a view in front elevation with parts broken away, of my shock absorber as associated with the front axle and front spring of the ordinary Ford car. Fig. 2 is a vertical cross-section, on an enlarged scale, through the adjustable shackle whereby the free end of the shock absorber is attached to the frame of the automobile. This view also shows the shock absorber partly in section to illustrate certain details of construction. Fig. 3 is an isometric view of the preferred form of hanger associated with the adjustable shackle, and Fig. 4 is, in part, a longitudinal section through one end of the shock absorber showing the preferred means whereby this end is held in relationship with the axle, part of which is shown in side elevation.

In the drawings, like characters of reference refer to the same parts.

1 is the front axle, and 2 the front spring coupled thereto in the usual manner at each end by the links 3 and brackets 4. 5 is the part of the frame of the vehicle, and the spring 2 is attached thereto by means of the U-shaped bolts 6 which pass through the plates 7. 8 are nuts co-acting with said bolts and plates.

The shock absorber is in the form of a spring 9, which may be composed of as many leaves as required. This spring is strapped to the axle 1 by means of the U-shaped bolts 10 which pass through the plate 11, against which rests the nuts 12 screwed on the outer ends of said bolts. As shown in Fig. 1 particularly, the spring 9 is located above the axle 1 and extends longitudinally thereof. In order to hold the outer end of said spring against lateral displacement in respect of the axle 1, I provide a U-shaped keeper 13 the sides 14 of which overlap the sides of the axle 1. This keeper is riveted to the upper leaf 15 by the rivet 16, the inner end of which is countersunk in the leaf 15.

An adjustable shackle is used to connect the free end of the spring 9 with the vehicle body, and the preferred form of this shackle is as follows: 17 is a hanger integrally formed with a hook 18, and provided with an eye 19 in which is pivoted a link 20. 21 is a link pivoted by the pin 22 in the eye 23 of the spring 9. The links 20 and 21 are coupled together by means of a strap 24, or its equivalent, adjustable in character, so that the tension of said spring 9 may be adjusted as desired.

By loosening the nuts 8, the U-bolts 6 can be loosened sufficiently to permit the hook 18 to be passed between the same, and the part 5 of the frame shown, and then afterwards these nuts are tightened up. Then the spring 9 is attached to the axle 1 by means of the clip formed by the U-bolts 10 and plate 11 and nuts 12. Of course the spring 9 may be attached to the axle 1 before its free end is attached to the part 5 of the frame.

25 is a U-shaped bracket riveted by means of the rivet 26 in the top leaf 15 of the spring 9, in the same manner as the keeper 13 shown in Fig. 4, and between its lower ends, this bracket supports the buffer preferably in the form of a roller 27 mounted on a pin 28 held in the lower ends of said bracket. This buffer will prevent noisy contact between the spring 9 and the axle 1. In place of said roller of course any other suitable element may be used, provided it will deaden the sound.

Although I have only shown one of the springs 9, it will be understood that they are intended to be used in pairs.

When the body of the car is subjected to vibration, particularly when it is passing over the uneven surface of a road, the springs of the car are alternately compressed and relaxed, and it is during the relaxing of these springs that my shock absorber exerts a counterpull or tension thereagainst. Of course the spring 9 is positioned so as to always exert a countertension against the springs of the vehicle.

Changes in details of construction may be made without going outside the scope of my claims.

What I claim is:

1. A device of the class described comprising a resilient lever clamped at one portion intermediate its ends to a supporting member forming part of an automobile, and adapted to extend longitudinally of the motor vehicle spring; the free end of said lever adapted to be adjustably coupled to said motor vehicle, the other end of said lever adapted to be held against lateral displacement in respect of said supporting member, and an anti-noise device carried by said lever and located between the same and said supporting member.

2. In an automobile, in combination a resilient lever adapted to be located to extend longitudinally of the spring of the vehicle it is associated with; means whereby said lever is clamped to a supporting member forming part of said vehicle, intermediate its ends; a keeper associated with one end of said lever and adapted to co-act with said supporting member to hold said lever against lateral displacement in respect of said member; an adjustable shackle adapted to couple the free end of said lever to a part of said motor vehicle frame, and a buffer permanently carried by said lever and in part interposed between the same and said first-mentioned supporting member.

ROYDEN IVOR SPENCER.